United States Patent
Collin

(10) Patent No.: US 9,885,575 B2
(45) Date of Patent: Feb. 6, 2018

(54) VEHICLE POSITIONING

(71) Applicant: JC INERTIAL OY, Viiala (FI)

(72) Inventor: Jussi Collin, Viiala (FI)

(73) Assignee: JC INERTIAL OY, Akaa (FI)

( * ) Notice: Subject to any disclaimer, the term of this patent is extended or adjusted under 35 U.S.C. 154(b) by 548 days.

(21) Appl. No.: 14/390,063

(22) PCT Filed: Apr. 2, 2013

(86) PCT No.: PCT/FI2013/050357
§ 371 (c)(1),
(2) Date: Oct. 2, 2014

(87) PCT Pub. No.: WO2013/150183
PCT Pub. Date: Oct. 10, 2013

(65) Prior Publication Data
US 2015/0094980 A1    Apr. 2, 2015

(30) Foreign Application Priority Data

Apr. 4, 2012 (FI) ..................... 20125386

(51) Int. Cl.
| | |
|---|---|
| G01C 21/16 | (2006.01) |
| G01C 22/02 | (2006.01) |
| G01C 19/02 | (2006.01) |
| G01P 15/14 | (2013.01) |
| G01C 25/00 | (2006.01) |

(52) U.S. Cl.
CPC ............. *G01C 19/02* (2013.01); *G01C 21/16* (2013.01); *G01C 22/02* (2013.01); *G01C 25/005* (2013.01); *G01P 15/14* (2013.01)

(58) Field of Classification Search
CPC ........ G01C 21/16; G01C 22/02; G01C 19/02; G01C 25/005; G01P 15/14
See application file for complete search history.

(56) References Cited

U.S. PATENT DOCUMENTS

| 5,722,922 A | 3/1998 | Watterson et al. |
| 2006/0293826 A1 | 12/2006 | Hong et al. |

(Continued)

FOREIGN PATENT DOCUMENTS

| EP | 0762363 A1 | 3/1997 |
| EP | 2017774 A2 | 1/2009 |

(Continued)

OTHER PUBLICATIONS

International Search Report from International Appl. No. PCT/FI2013/050357, dated Jun. 24, 2013, 6 pages.

(Continued)

*Primary Examiner* — Bryan Bui
(74) *Attorney, Agent, or Firm* — TechLaw LLP

(57) ABSTRACT

The invention relates to an inertial unit for being attached to a rotatable part of a vehicle, the rotatable part being coupled to a power equipment of the vehicle, the inertial unit including: at least one acceleration sensor and/or at least one magnetometer arranged to detect a tilting angle of the rotatable part, and/or at least one counter device arranged to detect rotations of the rotatable part, and at least one gyroscope arranged to detect directions at a rim level of the rotatable part for providing angular information for positioning.

11 Claims, 2 Drawing Sheets

(56) References Cited

U.S. PATENT DOCUMENTS

Figure 1:
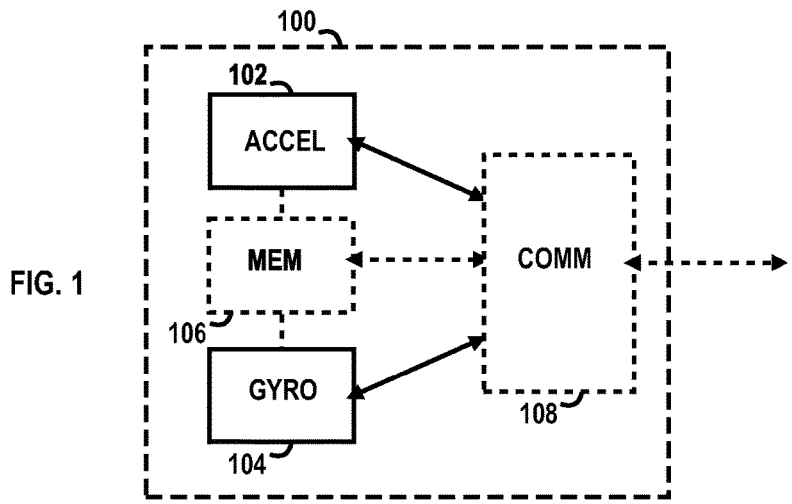

| | | | |
|---|---|---|---|
| 2009/0099730 A1 | 4/2009 | McClure et al. | |
| 2010/0017124 A1* | 1/2010 | Zhao | G01C 21/165 |
| | | | 701/455 |
| 2011/0082663 A1 | 4/2011 | Geisler et al. | |
| 2011/0313703 A1* | 12/2011 | Petillon | G01C 19/34 |
| | | | 702/96 |

FOREIGN PATENT DOCUMENTS

| | | |
|---|---|---|
| EP | 2239539 A2 | 10/2010 |
| KR | 20110061184 A | 6/2011 |
| WO | 2012/020166 A1 | 2/2012 |

OTHER PUBLICATIONS

J. Pansiot et al., 2011 Meas. Sci. Technol. 22 105801 doi:10.1088/0957-0233/22/10/105801, "WISDOM: wheelchair inertial sensors for displacement and orientation monitoring," Oct. 2011, 18 pages.

E. S. Geller, "Inertial system platform rotation," Aerospace and Electronic Systems, IEEE Transactions on, vol. AES-4, No. 4, pp. 557-568, Jul. 1968, 12 pages.

B. Renkoski, "The effect of carouseling on MEMS IMU performance for gyrocompassing applications," S.M. thesis, Massachusetts Institute of Technology, Jun. 2008, 97 pages.

* cited by examiner

VEHICLE POSITIONING

FIELD

The invention relates to apparatuses, methods, computer programs and computer-readable media.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

A gyroscope is a device designed for measuring or maintaining orientation, usually by measuring angular rate of turn in relation to a defined axis. Gyroscopes may be manufactured based on several techniques, but micro electrical mechanical system (MEMS) gyroscopes are becoming most popular especially in consumer electronics and other large scale applications and products due to their low manufacturing costs, size and low power consumption. MEMS gyroscopes are typically vibratory gyroscopes. Gyroscopes are used in positioning applications.

Acceleration sensors or accelerometers are designed to detect changes in force resulting from fall, tilt, motion, positioning, shock and/or vibration. They may be produced based on MEMS-technology as well. Acceleration sensors or accelerometers are used in positioning applications.

A magnetometer is a measuring device used to measure the strength or direction of magnetic fields. Magnetometers are used in positioning applications.

BRIEF DESCRIPTION

According to an aspect of the present invention there is provided an inertial unit, an apparatus and a method as defined in the accompanying independent claims.

According to an aspect of the present invention, there is provided an inertial unit for being attached to a rotatable part of a vehicle, the rotatable part being coupled to a power equipment of the vehicle, the inertial unit comprising: at least one acceleration sensor and/or at least one magnetometer arranged to detect a tilting angle of the rotatable part, and/or at least one counter device arranged to detect rotations of the rotatable part, and at least one gyroscope arranged to detect directions at a rim level of the rotatable part for providing angular information for positioning.

According to an aspect of the present invention, there is provided an apparatus for being attached to a rotatable part of a vehicle, the rotatable part being coupled to a power equipment of the vehicle, the apparatus comprising: at least one acceleration sensor and/or at least one magnetometer arranged to detect a tilting angle of the rotatable part, and/or at least one counter device arranged to detect rotations of the rotatable part, and at least one gyroscope arranged to detect directions at a rim level of the rotatable part for providing angular information for positioning, and means (210) for processing data, the data comprising the detected tilting angle and/or detected rotations and the angular information, by using the tilting angle and/or the detected rotations for at least one coordinate system transformation and by using rotation of the rotatable part for compensating gyroscope bias for compensating inaccuracy of the angular information.

According to an aspect of the present invention, there is provided a method comprising: obtaining data on a tilting angle of a rotatable part of a vehicle and/or rotations and angular information, and processing the data by using the tilting angle and/or the detected rotations for at least one coordinate system transformation and by using rotation of the rotatable part for compensating gyroscope bias for compensating inaccuracy of the angular information.

LIST OF DRAWINGS

Figure 2:
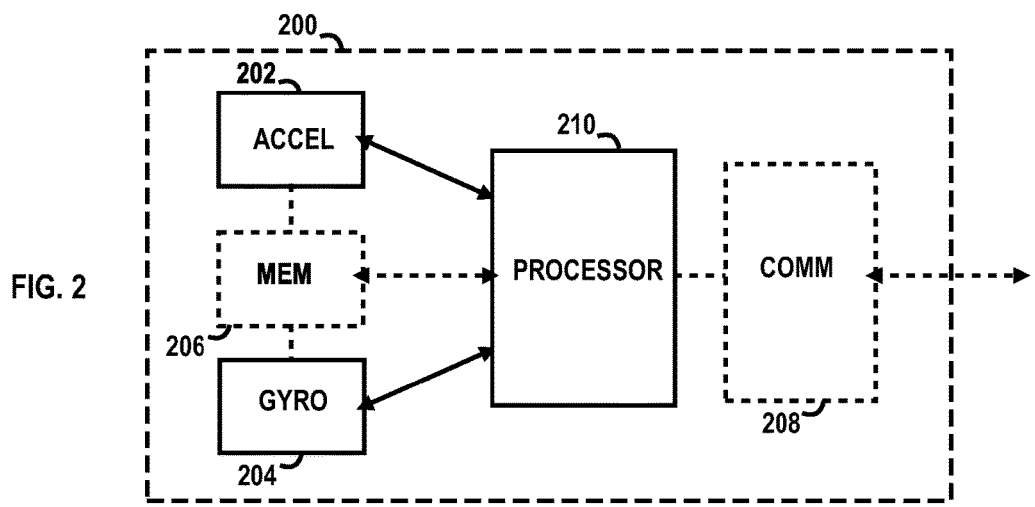
Figure 4:
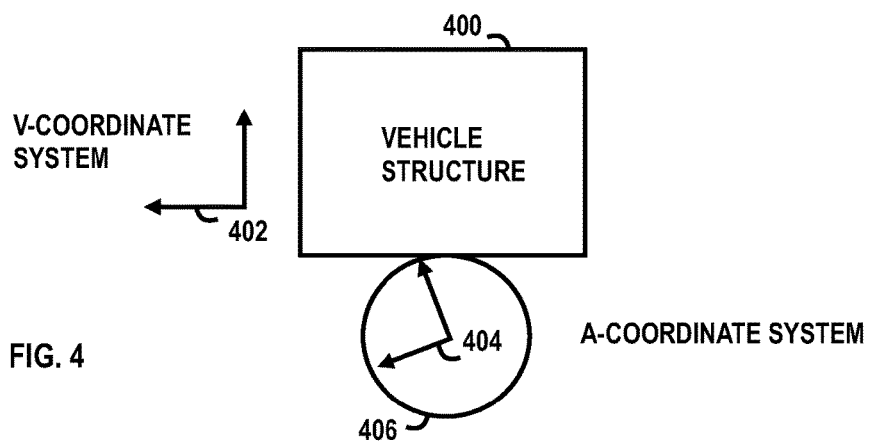
Figure 3:
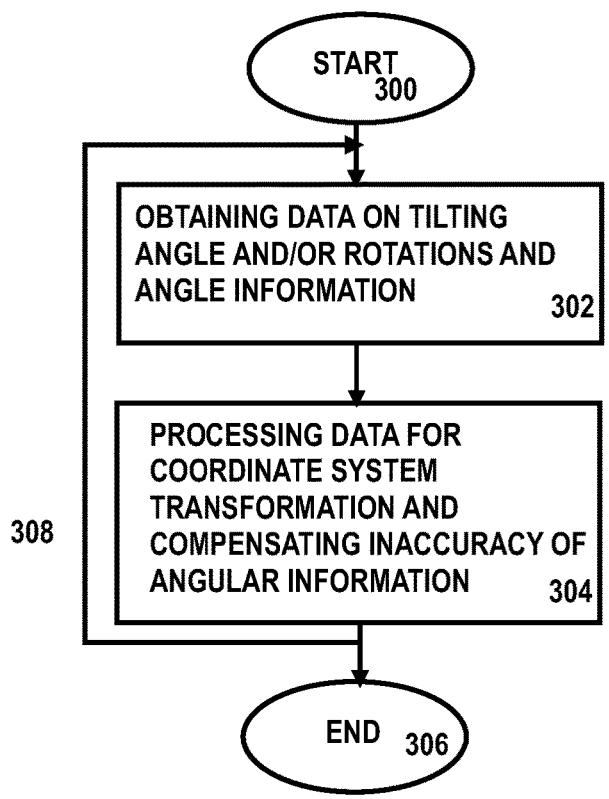
Figure 5:
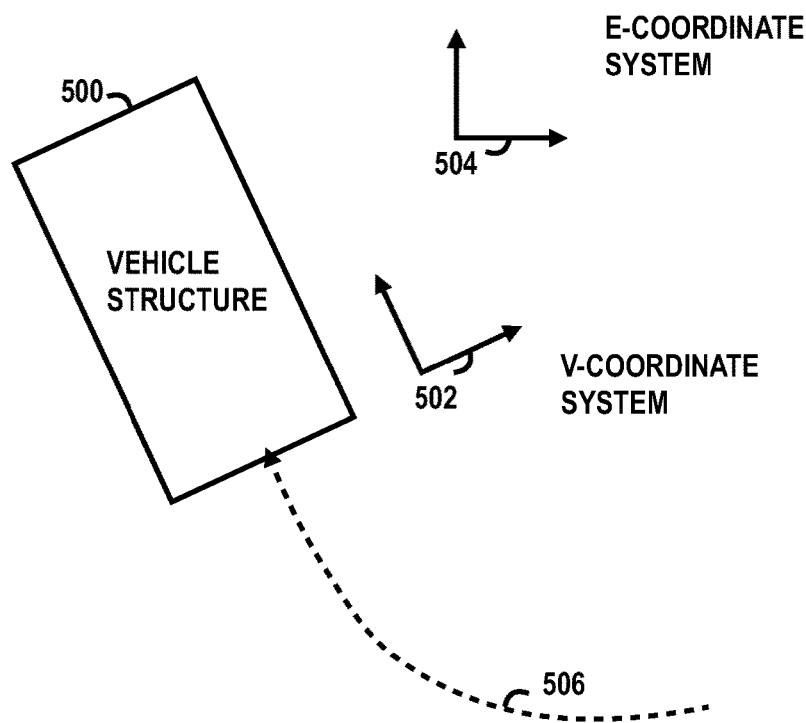

Some embodiments of the present invention are described below, by way of example only, with reference to the accompanying drawings, in which FIG. 1 illustrates an example of an inertial unit;
FIG. 2 illustrates an example of an apparatus;
FIG. 3 is a flow chart;
FIG. 4 illustrates an exemplifying application, and
FIG. 5 illustrates another exemplifying application.

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

A gyroscope is a device designed for measuring or maintaining orientation usually by measuring angular rate of turn in relation to a defined axis. Gyroscopes may be manufactured based on several techniques, but micro electrical mechanical system (MEMS) gyroscopes are becoming most popular especially in consumer electronics and other large scale applications and products due to their low manufacturing costs, size and low power consumption. MEMS gyroscopes are typically vibratory gyroscopes.

Gyroscopes implemented by using MEMS-technology are inferior in accuracy to ring laser gyroscopes or interferometric fiber optic gyroscopes, for instance, due to errors caused by bias. Hence, traditional inertial navigation methods based on accurate gyroscopes are typically not suitable as such when MEMS-based inertial units are used, but methods for improving the accuracy are required.

The quality of a MEMS gyroscope is usually defined by the magnitude of a constant additive unpredictable part of bias errors. In positioning applications, the angular rate measurement outputs from one or more MEMS gyroscopes are usually integrated to obtain change in orientation, for example an angle value which expresses the change in the heading of a vehicle. Thus, constant bias errors in angular rate are also integrated into an angle error. The constant part of a bias may be at least partly cancelled by means of carouseling. Carouseling typically involves controlled rotation of the device used for positioning in relation to one or more axes. Additionally, the carouseling needs means to provide a desired angle change. Another method is to make measurements when a vehicle of interest is not moving and then averaging the measurement results to obtain an estimate of the bias. These methods are, however, not advantageous as such in many practical applications due to the time spent and the time variant nature of the behavior of a typical MEMS-gyroscope (it may change every time it is powered up, according to temperature, etc.). It should be appreciated that controlled carouseling also requires additional hardware that may not be cost effective.

In carouseling, to cancel constant bias (at least partly, depends on the required accuracy), a repetitive rotation is usually required and information on the time when a full (360°) revolution circulation is completed. Thus, in vehicle applications, a rotation of a wheel may be utilized: wheels rotate when the vehicle moves and this rotation may be measured by the vehicle itself or using additional sensors. Thus, an apparatus providing information for positioning may be attached to the wheel or tyre or any other rotatable part (such as a pedal or treadle) of a vehicle which part is related to the movement of the vehicle. A vehicle may be any device or means of conveyance which moves by using one or more rotating wheels or tyres, such as a car, truck, trailer truck, lorry, van, tractor, fork-lift, motor bike, cycle, moped, camper, earth-mover, vehicles or machines used in mines or harbours, etc.

Embodiments are suitable for vehicle positioning and navigation purposes for instance when global positioning system (GPS), global navigation satellite system (GNSS) or other corresponding signals are not available.

One embodiment may be carried out by an inertial unit which is attachable to the wheel of a vehicle. The inertial unit is attachable to a rotatable part of a vehicle, the rotatable part being coupled to a power equipment of the vehicle directly or indirectly (indirectly may for instance mean that the rotatable part may be a back wheel, when the vehicle is front-driven). In other words, the rotatable part may be a wheel, tyre, crank arm, etc. Term "power equipment" is used to describe motors, engines, power transmission means, accumulators, drives, bicycle chains, etc. It should be appreciated that a normal steering wheel is usually not suitable for the embodiment (no regular repetitive rotation). One example of an inertial unit is shown in FIG. 1.

The exemplifying inertial unit 100 comprises: at least one acceleration sensor and/or at least one magnetometer arranged to detect a tilting angle of the rotatable part, and/or at least one counter device 102 arranged to detect rotations of the rotatable part, and at least one gyroscope 104 arranged to detect directions at a rim level of the rotatable part for providing angular information for positioning.

Another embodiment is an apparatus which is attachable to a rotatable part of a vehicle, the rotatable part being coupled to a power equipment of the vehicle. In other words, the rotatable part may be a wheel, tyre, pedal or treadle, etc. Term "power equipment" is used to describe motors, engines, power transmission means, accumulators, drives, bicycle chains, etc. It should be appreciated that a normal steering wheel is usually not suitable for the embodiment. One example of an apparatus is depicted in FIG. 2.

The exemplifying apparatus 200 comprises: at least one acceleration sensor and/or at least one magnetometer arranged to detect a tilting angle of the rotatable part, and/or at least one counter device 202 arranged to detect rotations of the rotatable part, at least one gyroscope 204 arranged to detect directions at a rim level of the rotatable part for providing angular information for positioning and means 210 for processing data, the data comprising the detected tilting angle and/or detected rotations and the angular information, by using the tilting angle and/or the detected rotations for at least one coordinate system transformation and by using rotation of the rotatable part for compensating gyroscope bias for compensating inaccuracy of the angular information. The means for processing data may be or comprise a processor, chip set, a unit or module comprising a plurality of processors, a computer program product, or a medium comprising a computer program. The medium may be any entity or device capable of carrying the program and it may be a non-transitory medium. Computer programs, also called program products or programs, including software routines, applets and macros, may be stored in any apparatus-readable data storage medium and they include program instructions to perform particular tasks. Computer programs may be coded by a programming language, which may be a high-level programming language, such as objective-C, C, C++, C#, Java, etc., or a low-level programming language, such as a machine language, or an assembler.

The apparatus may be implemented by various means, for example by hardware (one or more devices), firmware (one or more devices), software (one or more modules), or combinations thereof. A software application may be a computer program designed to carry out required computations, otherwise an inertial unit usually comprises hardware parts alone or in combination with software. The computer program may be stored in a computer readable media, such as magnetic disks, cards, tapes, etc. The required number of acceleration sensor is typically two to provide direction information for trajectory computation.

The apparatus or inertial unit may also comprise means for storing data, such as one or more memory units 106 or 206. The memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

Additionally, the apparatus or the inertial unit may also comprise means for communicating 108 or 208 with an apparatus configured to process data the inertial unit obtains. The means may be a radio transceiver/transmitter or a radio link (Bluetooth©, Zigbee©, WiFi©, wireless local area network (WLAN), radio frequency identification (RFID), etc.). Another option is to use magnetic coding used in smart card applications, such as credit cards. In this case, the inertial unit may comprise or be coupled to a communication unit, which may encode data and convey it to a processing unit, such as a global positioning (GPS) device, or any other device having suitable data processing facilities. The communication unit may also count rotations of the rotatable part. In this case, if speed is fast enough, it is possible that data obtained by acceleration sensors or magnetometers may not be necessary, but it may be used for improving accuracy. Yet another option is a counter device the examples of which are explained below.

In the following, an embodiment of a method is described in further detail. As a part of the description of the method, some aspects of the inertial unit and/or apparatus are also clarified in relation to data processing, for instance. The exemplifying application of FIG. 1 is used for clarification purposes in this regard. Embodiments of the method may be implemented to the appropriate extent in an inertial unit or by an apparatus explained above.

The embodiment starts in block 300 of FIG. 3.

In block 302, data on a tilting angle of a rotatable part of a vehicle and/or rotations and angular information is obtained.

The information may be obtained by using a radio transceiver/receiver or a radio link (Bluetooth©, Zigbee©, WiFi©, WLAN, RFID, etc.). Another option is to use magnetic coding used in smart card applications, such as credit cards. Also the magnetic encoded data may be remote read. In the case an apparatus comprising means for data processing is used for carrying out the method, the data may be obtained internally as in common electronic devices and conveyed after processing to further applications, such as to be shown on an electronic map or for applications using augmented reality for controlling vehicles or machines.

Tilting angle expresses the angular position of a rotatable part, such as a wheel, tyre, pedal or treadle.

In block 304, the data is processed by using the tilting angle and/or the detected rotations for at least one coordinate system transformation and by using rotation of the rotatable part for compensating gyroscope bias for compensating inaccuracy of the angular information.

First, an example of a coordinate system transformation is explained.

One option for resolving components of a vector in another frame (coordinate system) is to use a direction cosine matrix. The direction cosine matrix is typically a 3×3 matrix that transforms a vector from a reference frame A to a reference frame B as follows:

$$m^B = C_A^B m^A, \quad (1)$$

wherein
$m^B$ denotes a vector in frame B,
$m^A$ denotes a vector in frame A
C denotes a cosine matrix,
A denotes an original frame, and
B denotes a transformation target frame.

If the angles between coordinate frame basis vectors are known, the direction cosine matrix may be determined as follows:

$$C_A^B = \begin{bmatrix} \cos(u, e_1) & \cos(u, e_2) & \cos(u, e_3) \\ \cos(v, e_1) & \cos(v, e_2) & \cos(v, e_3) \\ \cos(w, e_1) & \cos(w, e_2) & \cos(w, e_3) \end{bmatrix}, \quad (2)$$

wherein
(u, v, w) is the orthonormal basis of the coordinate frame B, and ($e_1, e_2, e_3$) is the basis of coordinate frame A. With 3 orthogonally mounted gyroscopes, the direction cosine matrix that transforms vectors from an inertial unit body frame to an inertial frame may be updated or estimated as follows:

$$\dot{C}_b^i = C_b^i \Omega_{ib}^b, \quad (3)$$

wherein
$\dot{C}_b^i$ denotes time derivate of matrix C,
and $\Omega_{ib}^b$ is a skew symmetric matrix of a form:

$$\Omega_{ib}^b = \begin{bmatrix} 0 & -r & q \\ r & 0 & -p \\ -q & p & 0 \end{bmatrix}, \quad (4)$$

wherein the matrix $\Omega_{ib}^b$ is formed by using information obtained by a gyroscope (scalars p, q, r) in relation to three axes:

$$\omega_{ib}^b = [p \ q \ r]^T, \quad (5)$$

wherein
T denotes a transpose of a matrix.

To obtain a more accurate coordinate transformation, one or two of the scalars (p, q, r) may be replaced by information obtained from an accelerometer, magnetometer (or a counter device that counts full revolutions). Thus, typically, only one or two gyroscopes are required.

The embodiment in relation to matrix transformation is explained above in a general case based on Titterton, D. H. and Weston, J. L., 2004 "Strapdown Inertial Navigation Technology", 2nd edition (Reston, Va.: AIAA), which is taken herein as a reference for clarifying transfer of a coordinate system.

It should be appreciated that another option to accelerometers or magnetometers is to use a brake disc or a brake block on combination of a switch or magnet. In this embodiment, a permanent magnet for counting full revolutions may be used. In this application, the combination of a brake disc or a brake block and a magnet or switch is called a counter device. Additionally a dynamo may be used to obtain energy from the rotation of a rotatable part.

Coordinate systems are shown in FIG. 4. It should be understood that these coordinates are taken herein only as examples and other coordinates may also be used according to a current application. In the FIG. 1, V-coordinate system 402 is in relation to vehicle structure 400 and A-coordinate system 404 is in relation to a wheel (rotatable part) 406 of the vehicle 400.

For positioning state variables listed below may be estimated. The state variables are described using the coordinate systems of the FIG. 1 as clarifying examples. These state variables are taken herein only as examples:

The angle of phase difference or a phase angle, in other words how much a rotatable part, such as a wheel, is rotated when the vertical axis (x-axis) of the A-coordinate system points upwards. The angle of phase difference may be unlimited and thus obtain values over $2\pi$.

Covered distance (d) and/or covered distance in a predetermined period of time ($\Delta d$). These state variables may be obtained by multiplying the angle of phase difference by a known radius of the rotatable part. In FIG. 5, in the case the vehicle itself has turned, the angle of this turn may be detected by using an additional coordinate system, namely E-coordinate system 504. When the V-coordinate 502 system is in relation to the vehicle or vehicle structure 500, the E-coordinate system is in relation to a map or screen etc. in such a manner, that the E-coordinate system shows map north or one or more other corresponding directions. Hence, the angle of the vehicle (heading) may be detected by comparing V-coordinate system and E-coordinate system. This gives information on the vehicles direction (w) in two-dimension space. An example of a trajectory is shown by a reference number (506).

Referring to Equation (5), the location coordinates of a vehicle may be expressed as $$p = [x \ y \ z]^T, \quad (6)$$

wherein
x denotes a coordinate point in relation to a first horizontal axis (Easting, for example),
y denotes a coordinate point in relation to a second horizontal axis (Northing, for example),
z denotes a coordinate point in relation to the axis depicting depth or third dimension (zero in 2D applications), and
T denotes matrix transpose.

Location information may be estimated or updated by:

$$\Delta p = C_V^E [0 \ \Delta d \ 0], \quad (7)$$

wherein,

Δp denotes change is location,

Δd denotes change in covered distance in a predetermined period of time, and $C_V^E$ denotes transformation from a vehicle's coordinate system to coordinate system of the applications, such as a map.

The matrix $C_V^E$ may be estimated or updated or estimated by using data obtained by a gyroscope when transformed to the V-coordinate system. The data is typically an integral of the change in a phase angle. If multiple gyroscopes are used, the data may be in a vector form. In one embodiment two gyroscopes are used and the measurements may be carried out at a rim level with about 90° angular spacing.

The angle of phase difference or phase angle of a rotatable part may be estimated in a plurality of manners. This phase angle is used to form direction matrix $C_A^B$ using Equation (2). Two examples are herein explained in further detail.

First Example

Let's assume that in a measurement result obtained by a stationary acceleration sensor or magnetometer (typically no accelerating movement exists). Then the measurement result depicts up-direction directly (acceleration may be presumed as an error term). Assuming that the rotation axis of a rotatable part is horizontal, an estimate of a direction cosine matrix may be obtained by normalizing accelerometer readings and placing resulting terms m1 and m2 (two acceleration sensors available marked with 1 and 2) to:

$$C_A^V = \begin{bmatrix} 0 & 0 & 1 \\ m2 & -m1 & 0 \\ m1 & m2 & 0 \end{bmatrix}, \quad (8)$$

wherein m1 denotes a reading of a first accelerometer, and m2 denotes a reading of a second accelerometer.

The acceleration sensors or magnetometers are typically placed on a same axis (same axes) than gyroscopes.

It should be understood that measurements should be taken frequently enough in order to cancel constant bias of gyroscopes at least substantially. In other words, after a rotatable part has rotated a full rotation (360°), measurement signals set constant terms to zero as the sum of samples m1 over a full rotation is very close to zero and sum of samples m2 over a full rotation is very close to zero as well.

Second Example

The moment when a full rotation is completed is estimated or detected and data (angular rates) with regard to one rotation is gathered from at least one gyroscope. The gyroscope data of a first gyroscope is multiplied by sine series and the gyroscope data of second gyroscope is multiplied by cosine series, both series selected in such a manner that they represent as accurately as possible the m1 and m2 accelerometer series (see the previous example), and that the sum of the series is zero as exactly as possible. Thus, the constant part of gyroscope bias is cancelled (at least partly). Suitable sine and cosine series may be pre-defined by simulations, and may be tabulated beforehand.

The estimation of a time instant when a full 360° rotation is completed is now explained.

Simple method suitable for slow moving vehicles is to follow acceleration signals and study zero crossings: in the case of two acceleration sensors, the direction can be deduced by observing which one crossing the zero first. Additionally, each zero crossing (from negative to positive, for example) is taken as a full rotation of a rotatable part.

When a vehicle moves faster, a filter that is suitable for estimating a state by using noisy observations, such as a Kalman filter, may be applied in angle estimation. Kalman filtering may be used to improve estimation of the angle of a rotatable part and thus to make estimation of zero crossings easier.

Instead of accelerometers or a magnetometer, a simple switch, or magnet in combination of a brake disc or block, or similar counter device may be used to detect full 360° rotations, in which case sine and cosine series may be generated to be equal in length of the gyroscope data samples obtained during the time of the full rotation.

Once the gyroscope samples are transformed to the V-coordinate system, traditional dead reckoning algorithms may be applied.

It should be understood that when a magnetometer is used, it may be advantageous to generate a magnetic field around the used rotatable part by using a magnet attached to a non-rotatable part of a vehicle.

The embodiment ends in block 306. The embodiment is repeatable in many ways. One example is shown by arrow 308 in FIG. 3.

The steps/points, signaling messages and related functions described above in FIG. 3 are in no absolute chronological order, and some of the steps/points may be performed simultaneously or in an order differing from the given one. Other functions may also be executed between the steps/points or within the steps/points and other signaling messages sent between the illustrated messages. Some of the steps/points or part of the steps/points can also be left out or replaced by a corresponding step/point or part of the step/point.

The techniques described herein may be implemented by various means. For example, these techniques may be implemented in hardware (one or more devices), firmware (one or more devices), software (one or more modules), or combinations thereof. As a computer program or computer program product may be implemented the method described by means of FIG. 3.

For a hardware implementation, the apparatus carrying out the method described by means of FIG. 3, may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus for vehicle positioning using a coordinate system transformation, the apparatus being attachable to a rotatable part of a vehicle having an axis of rotation, the rotatable part being coupled to a power equipment of the vehicle, the apparatus comprising:
   at least one of an acceleration sensor arranged to detect a tilting angle of the rotatable part around the axis of rotation over time, a magnetometer arranged to detect the tilting angle of the rotatable part around the axis of rotation over time,
   a counter device arranged to detect a number of full rotations of the rotatable part around the axis of rotation over time, and
   at least one gyroscope arranged to detect a change in direction at a rim level of the rotatable part for providing information on an angular rate of turn in relation to a defined axis different from the axis of rotation for the vehicle positioning, and
   means for processing data operatively connected to at least one of the acceleration sensor, the magnetometer, and the counter device, and operatively connected to the at least one gyroscope, to receive data comprising at least one of the detected tilting angle over time or the detected number of full rotations over time and comprising the information on the angular rate of turn, wherein the means for processing data is arranged to carry out at least one coordinate system transformation on the basis of the detected information on the angular rate of turn over time and at least the detected tilting angle over time or the detected number of full rotations over time, and wherein at least one of the tilting angle over time or the number of full rotations over time of the rotatable part is used for compensating gyroscope bias in order to compensate for inaccuracy of the detected information on the angular rate of turn in the coordinate system transformation.

2. The apparatus of claim 1, wherein the at least one coordinate system transformation is carried out by using at least one direction cosine matrix.

3. The apparatus of claim 2, wherein the direction cosine matrix is estimated by normalizing accelerometer readings or by using data obtained by the at least one gyroscope.

4. The apparatus of claim 1, wherein the apparatus has at least two gyroscopes having an angular spacing of about 90°.

5. The apparatus of claim 1, wherein an angle of phase difference, covered distance and/or covered distance in a predetermined period of time are estimated by the data processing.

6. The apparatus of claim 1, wherein the data processing comprises updating location information of the vehicle by using change in covered distance in a predetermined period of time in relation to selected axes transferred to a selected coordinate system.

7. The apparatus of claim 1, wherein a moment of completing a full rotation is estimated or detected and data with regard to one rotation is gathered from the at least one gyroscope.

8. A method for vehicle positioning using a coordinate system transformation, the method comprising:
   at least one of obtaining data on a number of full rotations of a rotatable part of a vehicle around an axis of rotation over time and obtaining data on a tilting angle of the rotatable part of the vehicle around an axis of rotation over time and
   obtaining data on an angular rate of turn in relation to a defined axis different from the axis of rotation by at least one gyroscope arranged to detect a change in direction at a rim level of the rotatable part for the vehicle positioning, and
   processing the data comprising at least one of the tilting angle of the rotatable part over time or the number of full rotations of the rotatable part over time and comprising the angular rate of turn of the rotatable part over time by at least one coordinate system transformation, wherein the at least one coordinate system transformation is carried out on the basis of the information on the angular rate of turn over time and at least one of the obtained tilting angle over time or the obtained number of full rotations over time, and by using at least one of the tilting angle over time or the number of full rotations over time of the rotatable part for compensating gyroscope bias in order to compensate inaccuracy of the obtained information on the angular rate of turn in the coordinate system transformation.

9. The method of claim 8, wherein an angle of phase difference, covered distance and/or covered distance in a predetermined period of time are estimated by the data processing.

10. The method of claim 8, wherein processing the data comprises updating location information of the vehicle by using change in covered distance in a predetermined period of time in relation to selected axes transferred to a selected coordinate system.

11. The method of claim 8, wherein a moment of completing a full rotation is estimated or detected and data with regard to one rotation is gathered from the at least two gyroscopes.

* * * * *